United States Patent
De La Puente et al.

(10) Patent No.: US 6,647,800 B2
(45) Date of Patent: *Nov. 18, 2003

(54) TEMPERATURE INSENSITIVE FIBER-OPTIC TORQUE AND STRAIN SENSOR

(75) Inventors: Gonzalo De La Puente, Ottawa (CA); Paul E. Jessop, Hamilton (CA)

(73) Assignee: McMaster University, Hamilton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/304,049

(22) Filed: Nov. 26, 2002

(65) Prior Publication Data

US 2003/0126930 A1 Jul. 10, 2003

Related U.S. Application Data

(63) Continuation-in-part of application No. 09/703,230, filed on Nov. 1, 2000, now Pat. No. 6,513,390.

(51) Int. Cl.$^7$ .................................................. G01L 1/24
(52) U.S. Cl. ........................................................ 73/800
(58) Field of Search ............................ 73/800, 862.324, 73/862.624, 762, 705; 356/33, 364, 366, 367; 252/231.19, 225

(56) References Cited

U.S. PATENT DOCUMENTS

| | | |
|---|---|---|
| 4,123,158 A | 10/1978 | Reytblatt |
| 4,347,748 A | 9/1982 | Pierson |
| 4,556,791 A | 12/1985 | Spillman, Jr. |
| 4,668,086 A | 5/1987 | Redner |
| 4,777,358 A | 10/1988 | Nelson |
| 4,912,355 A | 3/1990 | Noel et al. |
| 4,939,368 A | 7/1990 | Brown |
| 5,298,964 A | 3/1994 | Nelson et al. |
| 5,438,879 A | 8/1995 | Reda |
| 5,649,035 A * | 7/1997 | Zimmerman et al. ......... 385/13 |
| 5,693,889 A | 12/1997 | Nadolink |
| 5,723,794 A | 3/1998 | Discenzo |
| 5,728,944 A | 3/1998 | Nadolink |
| 5,817,945 A | 10/1998 | Morris et al. |
| 5,864,393 A | 1/1999 | Maris |
| 6,055,053 A | 4/2000 | Lesniak |

OTHER PUBLICATIONS

A.D. Kersey, M.A. Davis, H.J. Patrick, M. LeBlanc, K.P. Koo, C.G. Askins, M.A. Putnam, and E.J. Friebele, "Fiber Grating Sensors," J. Lightwave Technol. 15 (8), 1442–1463 (1997).

K.A. Murphy, W.V. Miller, T.A. Tran, A.M. Vengsarkar, and R.O. Claus, "Miniaturized fiber–optic Michelson–type interferometric sensors," Appl. Opt. 30(34), 5063 5067 (1991).

S.C. Kaddu, S.F. Collins, and D.J. Booth, "Multiplexed intrinsic optical fibre Fabry–Perot temperature and strain sensors addressed using white–light interferometry," Meas. Sci. Technol. 10, 416–420 (1999).

(List continued on next page.)

*Primary Examiner*—Edward Lefkowitz
*Assistant Examiner*—C. D.
(74) *Attorney, Agent, or Firm*—Lynn C. Schumacher; Hill & Schumacher

(57) ABSTRACT

The present invention provides a simple design for a temperature-insensitive extrinsic polarimetric strain sensor. The sensing element is a thin sheet of photoelastic material that is bonded to the test object. It is illuminated with linearly polarized light with the polarization direction at 45 degrees relative to the strain-induced fast and slow axes in the photoelastic material. The sensor measures the difference between the strains along these two orthogonal directions. The reduced sensitivity of the sensor to temperature results from the fact that the illumination is perpendicular to the surface of the test object. All polarization components that are parallel to the surface will experience identical refractive index changes due to thermal effects. Consequently, a measurement of the difference in strains along two directions in the surface plane is insensitive to temperature.

23 Claims, 7 Drawing Sheets

OTHER PUBLICATIONS

W. J. Bock and W. Urbanczyk, "Temperature desensitization of a fiber–optic pressure sensor by simultaneous measurement of pressure and temperature," App. Opt. 37(18), 3897–3901 (1998).

C.S. Sun, L. Wang, Y. Wang, and J. Lin, "Design of a high–sensitivity photoelastic optical fiber pressure sensor: a differential approach," IEEE Photon. Technol. Lett. 9(7) 976–978 (1997).

K.A. Murphy, M.F. Gunther, R.O. Claus, T.A. Tran, and M.S. Miller, "Optical fiber sensors for measurement of strain and acoustic waves," *Smart Sensing, Processing and Instrumentation*, Proc. SPIE vol. 1918, 110–120 (1993).

T. Valis, D. Hogg, R.M. Measures, "Thermal apparent–strain sensitivity of surface adhered, fiber–optic strain gauges," Appl. Opt. 31(34), 7178–7179 (1992).

W. Jin, W.C. Michie, G. Thursby, M. Konstantaki, and B. Culshaw, "Simultaneous measurement of strain and temperature: error analysis," Opt. Eng. 36(2), 598–608 (1997).

J.D. Jones, "Review of fibre sensor techniques for temperature–strain discrimination," in 12th International Conference on Optical Fiber Sensors, vol. 16., 36–39, OSA Technical Digest Series (Optical Society of America, Washington, D.C., 1997).

R.D. Turner, D.G. Laurin, and R.M. Measures, "Localized dual–wavelength fiber–optic polarimeter for the measurement of structural strain and orientation," Appl. Opt. 31(16), 2994–3003(1992).

* cited by examiner

TEMPERATURE INSENSITIVE FIBER-OPTIC TORQUE AND STRAIN SENSOR

CROSS REFERENCE TO RELATED U.S. APPLICATION

This utility patent application is a continuation-in-part application of U.S. patent application, Ser. No. 09/703,230 filed on Nov. 1, 2000, entitled TEMPERATURE INSENSITIVE FIBER-OPTIC TORQUE AND STRAIN SENSOR which has now been allowed U.S. Pat. No. 6,513,390.

FIELD OF THE INVENTION

The present invention relates to torque and strain sensor, and more particularly this invention relates to a temperature insensitive fiber-optic torque and strain sensor.

BACKGROUND OF THE INVENTION

Fiber-optic strain sensors have been developed using a wide variety of approaches, including fiber Bragg grating sensors [A. D. Kersey, M. A. Davis, H. J. Patrick, M. LeBlanc, K. P. Koo, C. G. Askins, M. A. Putnam, and E. J. Friebele, "Fiber Grating Sensors," J. Lightwave Technol. 15(8), 1442–1463 (1997)], interferometric (Mach-Zehnder and Michelson) sensors [K. A. Murphy, W. V. Miller, T. A. Tran, A. M. Vengsarkar, and R. O. Claus, "Miniaturized fiber-optic Michelson-type interferometric sensors," Appl. Opt. 30(34), 5063 5067 (1991)], white-light interferometers [S. C. Kaddu, S. F. Collins, and D. J. Booth, "Multiplexed intrinsic optical fibre Fabry-Perot temperature and strain sensors addressed using white-light interferometry," Meas. Sci. Technol. 10, 416–420 (1999)], intrinsic polarimetric sensors based on polarization-maintaining (PM) fiber [W. J. Bock and W. Urbanczyk, "Temperature desensitization of a fiber-optic pressure sensor by simultaneous measurement of pressure and temperature," Appl. Opt. 37(18), 3897–3901 (1998)], extrinsic polarimetric sensors [C. S. Sun, L. Wang, Y. Wang, and J. Lin, "Design of a high-sensitivity photoelastic optical fiber pressure sensor: a differential approach," IEEE Photon. Technol. Lett. 9(7) 976–978 (1997)], and extrinsic Fabry-Perot sensors [K. A. Murphy, M. F. Gunther, R. O. Claus, T. A. Tran, and M. S. Miller, "Optical fiber sensors for measurement of strain and acoustic waves," Smart Sensing, Processing, and Instrumentation, Proc. SPIE Vol. 1918, 110–120 (1993)]. To varying degrees, all of these sensor types are plagued with the problem of cross-sensitivity to temperature. For example, polarimetric sensors that employ PM fiber exhibit a thermal apparent strain sensitivity on the order of 50 $\mu\epsilon/°$ C. [T. Valis, D. Hogg, R. M. Measures, "Thermal apparent-strain sensitivity of surface adhered, fiber-optic strain gauges," Appl. Opt. 31(34), 7178–7179 (1992)] and for other sensor types 10 $\mu\epsilon/°$ C. is typical [W. Jin, W. C. Michie, G. Thursby, M. Konstantaki, and B. Culshaw, "Simultaneous measurement of strain and temperature: error analysis," Opt. Eng. 36(2), 598–608 (1997)].

U.S. Pat. No. 5,723,794 issued to Discenzo is directed to a photoelastic torque sensor that uses a photoelastic polymer detector in conjunction with a photoelastic image sensor (CCD camera) and a neural network. The photoelastic polymer sheet is bonded to the component being monitored. The CCD camera receives the phase shifted light signal from the photoelastic sheet and generates a electrical signals indicative of the phase shift produced in the beam reflected from the sensor sheet. The neural network then calculates the torque based on these signals.

U.S. Pat. No. 4,668,086 issued to Redner discloses a method and device for measuring stress and strain in a thin film by passing a multi-wavelength beam through the thin film and then splitting the transmitted signal into different spatially separated wavelength beams. The intensities of the beams at each wavelength are analysed to produce a measure of the strain in the film.

U.S. Pat. No. 4,123,158 issued to Reytblatt discloses a photoelastic strain gauge comprising a photoelastic polymer sheet coated on the opposing planar faces with reflective coatings. This produces a waveguide-like structure so that light is multiply reflected along the polymer sheet before it exits and this acts to produce an amplification of the visual patterns reflective of the strain produced in the photoelastic sheet from the underlying object.

U.S. Pat. No. 5,864,393 issued to Maris discloses an optical method for measuring strain in thin films that involves pumping the thin film with optical pump pulses and at different time delays applying optical probe pulses and detecting variations in the transient response to the probe pulses arising in part due to the propagation of a strain pulse in the film.

U.S. Pat. No. 5,817,945 issued to Morris et al. discloses a method of sensing strain using a photoluminescent polymer coating. The method is predicated on the relative changes or competition between radiative and non-radiative decay mechanisms of excited photoluminescent probe molecules in the coating in the presence and absence of strain in the coating. Regions of the coating under greater strain due to strain in the underlying substrate show up as brighter areas in the processed images.

U.S. Pat. Nos. 5,693,889 and 5,728,944 issued to Nadolink disclose a method of measuring surface stress and uses a wafer of single crystal silicon which must be embedded in the material being monitored so the silicon surface is even with the substrate surface. Fringe patterns in the light reflected off the silicon surface are indicative of the stress present at the surface.

U.S. Pat. No. 4,939,368 issued to Brown discloses an optical strain gauge comprising a diffraction grating applied to a surface and a light from a source having at least two frequencies is reflected off the surface and the phase differences between the beams at the two wavelengths is related to the strain in the surface.

U.S. Pat. No. 4,912,355 issued to Noel et al. is directed to a superlattice strain gauge using piezoelectric superlattice deposited onto the substrate being monitored. Strain in the underlying substrate will add internal strain present in the superlattice which significantly changes the optical properties among the different superlattice layers and these changes are monitored by the light probe.

U.S. Pat. No. 4,347,748 issued to Pierson discloses a torque transducer for measuring torque on a rotating shaft. The device is based on attaching optically flat mirrors to the shaft and reflecting a laser beam off each of the flats. The relative phase displacements of the beams is indicative of the torque on the shaft.

U.S. Pat. No. 5,298,964 issued to Nelson et al. discloses an optical stress sensing system that is based on directing three separate polarized light beams along three different optical axes in a single photoelastic sensing element. The applied stresses in the three directions are determined independently, and through the use of sum-difference techniques applied to the output signals, the results can be made insensitive to fluctuations in light source intensity and to losses in the optical fibers that deliver the light.

U.S. Pat. No. 4,777,358 issued to Nelson discloses an optical differential strain gauge in which a light beam traverses two photoelastic elements in series. The two are secured on opposite faces of the test specimen so that the specimen transfers tensile strain to one and shear strain to the other. A fiber optic polarization rotator is inserted in the optical path between the two elements so that the system measures the difference between the transferred tensile and shear strains and environmental effects common to the two elements cancel.

U.S. Pat. No. 4,556,791 issued to Spillman discloses a stress sensor in which a light beam passes sequentially through a voltage controlled wave plate and a photoelastic element that is bonded to a test specimen. The optical powers in the two polarizations at ±45 degrees to the applied stress axis are detected and the resulting voltages applied to a difference amplifier. The amplifier output is fed back to the wave plate to null out the net phase retardation. The feedback signal is used as measure of applied stress.

A great deal of research has been devoted to developing schemes to compensate for temperature dependence or to perform simultaneous measurements of both strain and temperature [8, J. D. Jones, "Review of fibre sensor techniques for temperature-strain discrimination," in $12^{th}$ International Conference on Optical Fiber Sensors, Vol. 16, 36–39, OSA Technical Digest Series (Optical Society of America, Washington, D.C., 1997)]. Some very good results have been demonstrated, however reduced cross-sensitivity to temperature often comes at the cost of adding complexity to the strain sensing system.

It would be very advantageous to provide a combination strain and/or torque sensor having a reduced sensitivity to temperature.

SUMMARY OF THE INVENTION

It is an object of the present invention to provide a strain/torque sensor that has a low temperature sensitivity.

The present invention provides a simple design for a temperature-insensitive extrinsic polarimetric strain sensor. The sensing element is a thin sheet of photoelastic material that is bonded to the test object. It is illuminated with linearly polarized light with the polarization direction at 45 degrees relative to the strain-induced fast and slow axes in the photoelastic material. The sensor measures the difference between the strains along these two orthogonal directions. The reduced sensitivity of the sensor to temperature results from the fact that the illumination is perpendicular to the surface of the test object. All polarization components that are parallel to the surface will experience identical refractive index changes due to thermal effects. Consequently, a measurement of the difference in strains along two directions in the surface plane is expected to be insensitive to temperature.

In one aspect of the invention there is provided a method of measuring strain in a workpiece that is insensitive to ambient temperature fluctuations, comprising the steps of:
illuminating a strain-sensitive material with a beam of selectively polarized light, the beam of selectively polarized light being substantially perpendicular to the surface of the workpiece, the strain-sensitive material being in physical contact with the surface of the workpiece;
measuring an intensity of at least one polarization component of the beam of selectively polarized light making at least one pass through the strain-sensitive material, the at least one polarization component being tilted with respect to strain-induced fast and slow orthogonal axes in the strain-sensitive material so that it has a projection along both strain-induced fast and slow orthogonal axes; and
calculating from said intensity a difference between strains along the strain-induced fast and slow orthogonal axes in the strain-sensitive material, the difference being substantially independent of ambient temperature fluctuations.

In another aspect of the invention there is provided a method of measuring strain in a workpiece that is insensitive to ambient temperature fluctuations, comprising the steps of:
illuminating a strain-sensitive material with a beam of selectively polarized light, the beam of selectively polarized light being substantially perpendicular to the surface of the workpiece, the strain-sensitive material being in physical contact with the surface of the workpiece;
measuring a first intensity of a first polarization component and a second intensity of a second polarization component of the beam of selectively polarized light making at least one pass through the strain-sensitive material, the first and second polarization components being orthogonal to each other and tilted with respect to strain-induced fast and slow orthogonal axes in the strain-sensitive material parallel to the surface of the workpiece so that each of said first and second polarization components has a projection along both strain-induced fast and slow orthogonal axes; and
calculating from the first and second intensities a difference between strains along the strain-induced fast and slow orthogonal axes in the strain-sensitive material, the difference being substantially independent of ambient temperature fluctuations.

The present invention also provides a temperature insensitive strain sensor that is insensitive to ambient temperature fluctuations, comprising:
a strain-sensitive material adapted to be physically contacted to a surface of a workpiece;
light source means and light beam polarization means for illuminating said strain-sensitive material with a beam of selectively polarized light, said beam of selectively polarized light being substantially perpendicular to the surface of the workpiece; and
detection means for measuring an intensity of at least one of a first polarization component and a second polarization component in the beam of selectively polarized light making at least one pass through said strain-sensitive material, the at least one of a first and-second polarization components being tilted with respect to strain-induced fast and slow orthogonal axes in the strain-sensitive material parallel to the surface of the workpiece so that at least one of the at least first and second polarization components has a projection along both strain-induced fast and slow orthogonal axes; and
processing means connected to said detection means for calculating from the intensity of the at least one of a first polarization component and a second polarization component a difference between strains along the strain-induced fast and slow orthogonal axes in said strain-sensitive material, the difference between strains being substantially independent of ambient temperature fluctuations.

BRIEF DESCRIPTION OF THE DRAWINGS

The fiber optic torque and strain sensor constructed in accordance with the present invention will now be described, by way of example only, reference being had to the accompanying drawings, in which;

FIG. 1b is a schematic drawing of an embodiment of a strain and torque sensor similar to the sensor of FIG. 1a;

FIG. 5b is a top view of the test rig of FIG. 5a;

DETAILED DESCRIPTION OF THE INVENTION

Figure 1A:
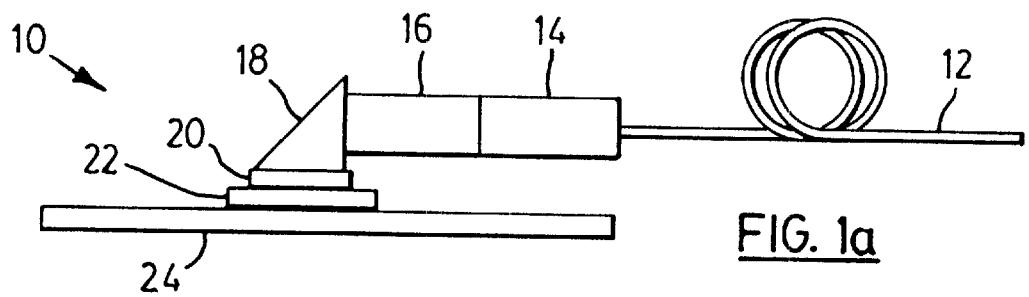
FIG. 1a is a schematic drawing of a first embodiment of a strain and torque sensor constructed in accordance with the present invention.

Broadly speaking, the present invention for measuring strain/torque uses a transparent strain-sensitive material bonded to the mechanical test object. A beam of selectively polarized light is directed into the strain-sensitive material along a direction that is substantially perpendicular or normal to the surface of the test object. Mechanical strain in the test object will be transferred into the strain-sensitive material, and the components of strain that are parallel to the surface will influence the optical path length inside the transparent material due to the photoelastic effect (a strain-induced change in refractive index). If the strain is not identical in all directions that lie in a plane that is parallel to the surface, then the polarization state of the light will change as it passes through the strain-sensitive material.

More particularly, the method of measuring strain in a workpiece that is insensitive to ambient temperature fluctuations comprises illuminating a strain-sensitive material with a beam of selectively polarized light with the beam of selectively polarized light being substantially perpendicular to the surface of the workpiece, the strain-sensitive material being in physical contact with the surface of the workpiece. The intensity of a first polarization component and the intensity of a second polarization component of the beam of selectively polarized light making at least one pass through the strain-sensitive material is measured where the first and second polarization components are orthogonal to each other and are tilted with respect to the strain-induced fast and slow orthogonal axes in the strain-sensitive material parallel to the surface of the workpiece so that each of the first and second polarization components has a projection along both strain-induced fast and slow orthogonal axes. There is then calculated from these two intensities a difference between strains along the strain-induced fast and slow orthogonal axes in the strain-sensitive material, the difference being substantially independent of temperature fluctuations.

The selectively polarized input light beam may be circularly, elliptically or linearly polarized, as long as it contains both a first component of polarization that is parallel to the strain-induced fast axis in the strain sensitive material and a second component of polarization that is parallel to the strain-induced slow axis. The light that is detected after making at least one pass through the strain sensitive material must also be of a polarization that contains both a first component of polarization that is parallel to the strain-induced fast axis in the strain sensitive material and a second component of polarization that is parallel to the strain-induced slow axis. The effect of strain is to change the intensity of the detected light due to changes in the relative phase of said two polarization components. When two orthogonal output polarizations are detected, their strain-induced intensity changes are equal and opposite, so that recording the ratio of the difference in these two intensities to their sum produces a signal that is independent of the input light intensity.

Preferred embodiments of the present method devices for a temperature-insensitive extrinsic polarimetric strain sensor will now be discussed. The sensing element is a strain-sensitive material, preferably a thin sheet of photoelastic material that is bonded to the test object. The method involves illuminating the strain-sensitive material with selectively polarized light which may be either circularly, elliptically or linearly polarized (preferably a laser beam or light emitting diode) with the light having approximately equal polarization components along the strain-induced fast and slow axes in the strain-sensitive material. This would be the case for circularly polarized light or linearly polarized light with a polarization direction at 45 degrees relative to the strain-induced fast and slow axes in the strain-sensitive material. It will be understood that elliptically polarized light or linearly polarized light with the polarization direction at angles deviating from 45 degrees could be used with similar results.

The illumination is substantially perpendicular to the surface of the test object, meaning that the illumination may be perpendicular for best results but those skilled in the art will appreciate that the direction of illumination may also deviate from perpendicular and still give efficacious strain differences. The intensity of light having made at least one pass through the strain-sensitive material is measured from which the difference between the strains along these two orthogonal directions is calculated. The reduced sensitivity of the sensor to temperature results from the fact that the illumination is perpendicular to the surface of the test object. Thus, all polarization components that are parallel to the surface will experience nearly, if not, identical refractive index changes due to thermal effects. Consequently, a measurement of the difference in strains along two directions in the surface plane is expected to be insensitive to temperature.

The fiber-optic sensor is extrinsic, meaning that optical fibers are used for delivery and collection of light, but the actual sensing element employs bulk optical components. Disclosed herein are several different embodiments of a strain and torque sensor including one-fiber and two-fiber embodiments that employ standard optical fibers and a third embodiment that employs a single polarization maintaining input/output fiber.

FIG. 1 illustrates a torque and strain sensor head for the single-fiber embodiment shown generally at 10. Sensor 10 includes a multimode optical fiber 12 for emitting and collecting light. Light emerging from optical fiber 12 through a capillary termination 14 is collimated by a graded index (GRIN) lens 16 that terminates the fiber 12. The light is reflected at by a 90° prism 18 and is then passed through a linear polarizer 20 that sets the polarization direction at 45 degrees relative to the direction of maximum applied strain. The light then passes through the photoelastic sheet material 22 that has been bonded to the surface of the test structure 24 under examination. The transmitted light is retroreflected by a metal coating on the photoelastic material's far side, and retraces its path through the polarizer and GRIN lens and back into the fiber. The 90° prism 18 shown in FIG. 1 is not essential to the operation of sensor 10 but it allows the fiber 12 to be positioned parallel to the test surface, and thereby reduces the overall height of the sensor. The GRIN lens 16, prism 18, polarizer 20 and photoelastic material 22 are bonded together with optically transparent epoxy to form a single assembly. This assembly is then bonded to the surface of the test structure 24.

Not wishing to have the present invention limited or bound by any particular theory or hypothesis, the polarizer 20 is oriented so that the field of the lightwave, as it enters the photoelastic material, may be written as $$E = \frac{E_o}{\sqrt{2}}[\hat{x} + \hat{y}] \tag{1}$$

where x and y specify the directions that are parallel and perpendicular to the known direction of the applied strain that is to be measured. The retroreflected wave, as it enters that polarizer, is described by $$E = \frac{E_o}{\sqrt{2}} e^{i\phi_x}[\hat{x} + e^{i(\phi_y - \phi_x)}\hat{y}] \tag{2}$$

where $\phi_x$ and $\phi_y$ are the total optical phase shift accumulated in the double pass by the x and y polarization components. The phase difference, $\phi_y - \phi_x$, is given by $$\phi_y - \phi_x = \frac{4\pi C_\varepsilon t}{\lambda}(\varepsilon_y - \varepsilon_x) \tag{3}$$

where $C_\varepsilon$ is the strain-optic coefficient of the photoelastic material, t is its thickness, $\lambda$ is the wavelength of the light, and $\varepsilon_y - \varepsilon_x$ is the difference in the strains along the y and x directions. The attenuation of the lightwave as it retraces its path through the polarizer varies sinusoidally with the phase difference so that the intensity of the return signal is given by $$I = \frac{I_o}{2}[1 + \cos(\phi_y - \phi_x)]. \tag{4}$$

Therefore the relative intensity of the retroreflected light may be used as a measure of the strain difference.

Equation 4 shows that in order to determine the strain difference from a measurement of the retroreflected intensity, I, the input intensity, $I_o$, should be known. $I_o$ can be determined by varying the applied strain so that I sweeps through its maximum value, where I=$I_o$. However, without continual monitoring of the input intensity, the sensor design shown in FIG. 1 may be subject to errors associated with drifting of the source power.

Figure 2A:
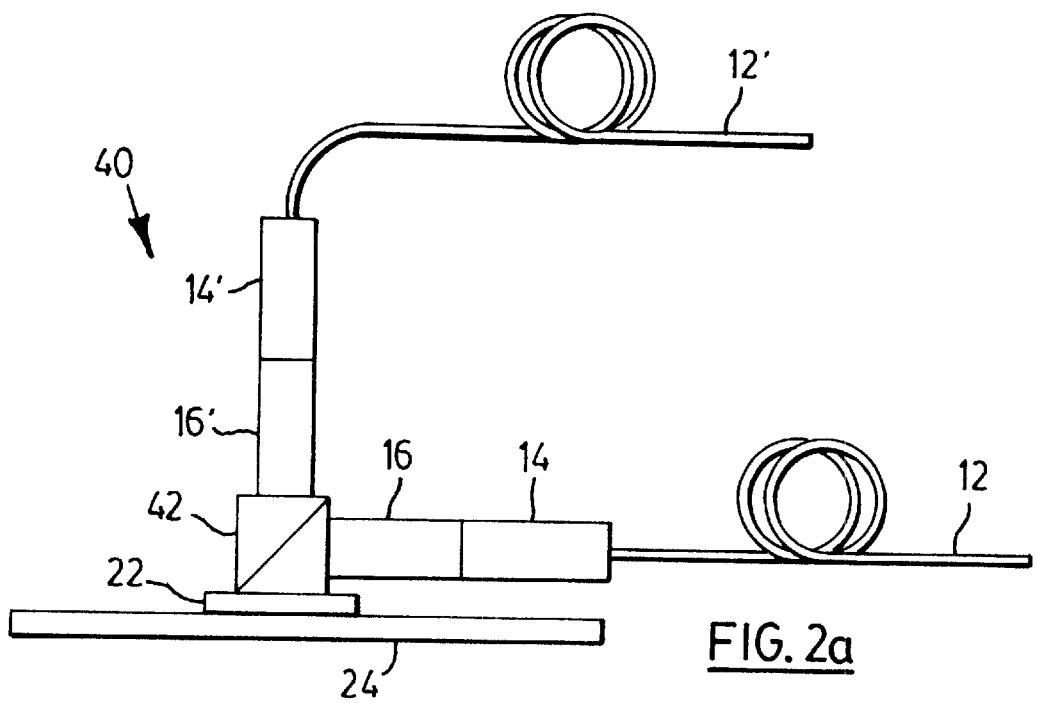
FIG. 2a is a schematic drawing of another embodiment of a strain and torque sensor using reflected light.

The two-fiber sensor 40 illustrated in FIG. 2 removes this difficulty. The polarizer 20 (FIG. 1) is replaced by a polarizing beamsplitter 42 in sensor 40 (FIG. 2). Thus the cross-polarized (or perpendicular) component of the retroreflected lightwave can be collected by a second GRIN lens 16'/fiber 12' combination rather than being simply absorbed as occurs in the polarizer 20 (FIG. 1). While the intensity returned in the input/output fiber is given by Equation 4 (just as in the single-fiber device 20 of FIG. 1), the intensity returned in the perpendicular polarization component is given by $$I' = \frac{I_o}{2}[1 - \cos(\phi_y - \phi_x)]. \tag{5}$$

From the measured values of I and I', one can generate an output signal, S, that is insensitive to fluctuations in the input power.

$$S = \frac{I - I'}{I + I'} = \cos(\phi_y - \phi_x). \tag{6}$$

Figure 2B:
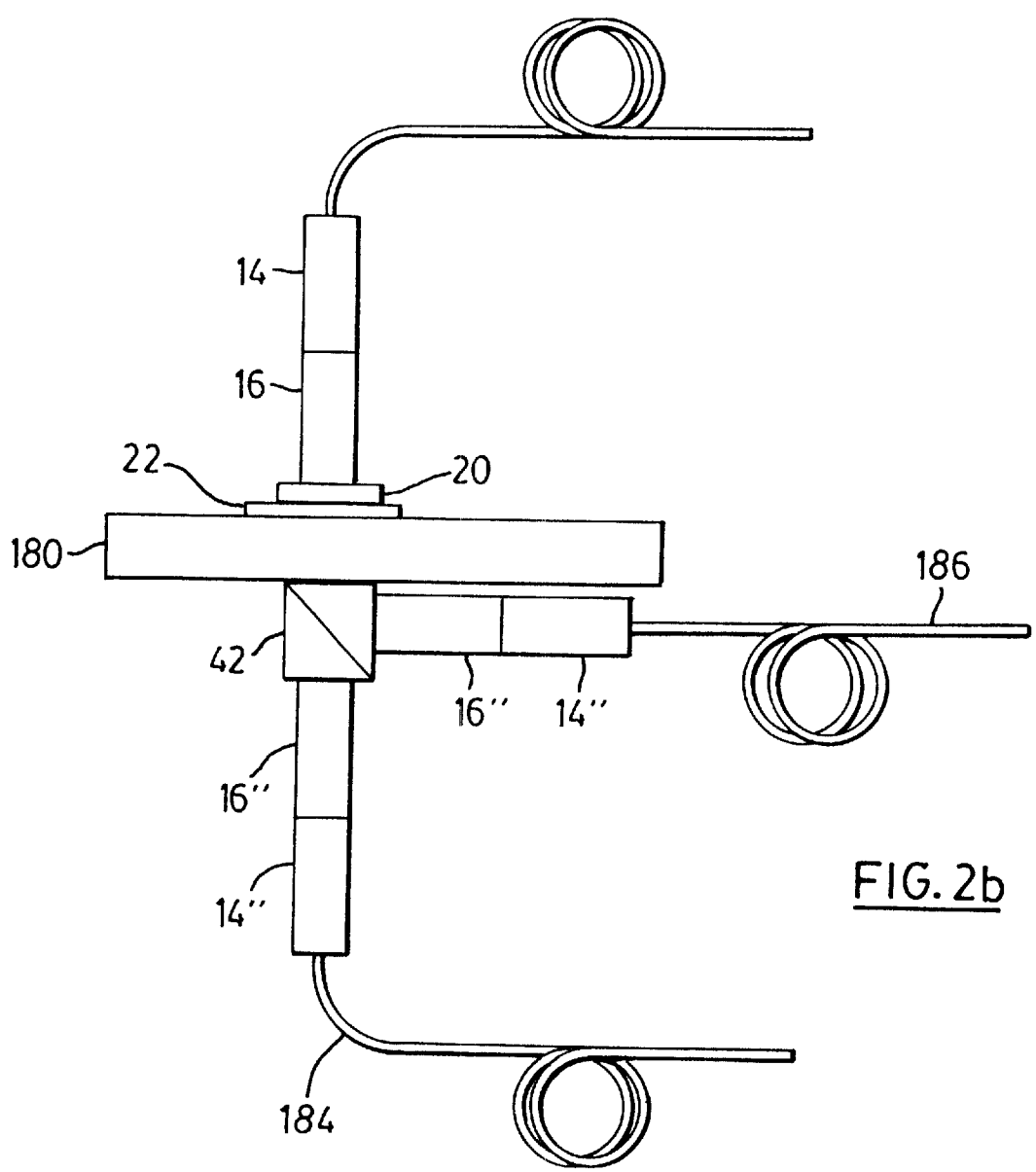
FIG. 2b is a schematic drawing of another embodiment of a strain and torque sensor using transmitted light.
Figure 3:
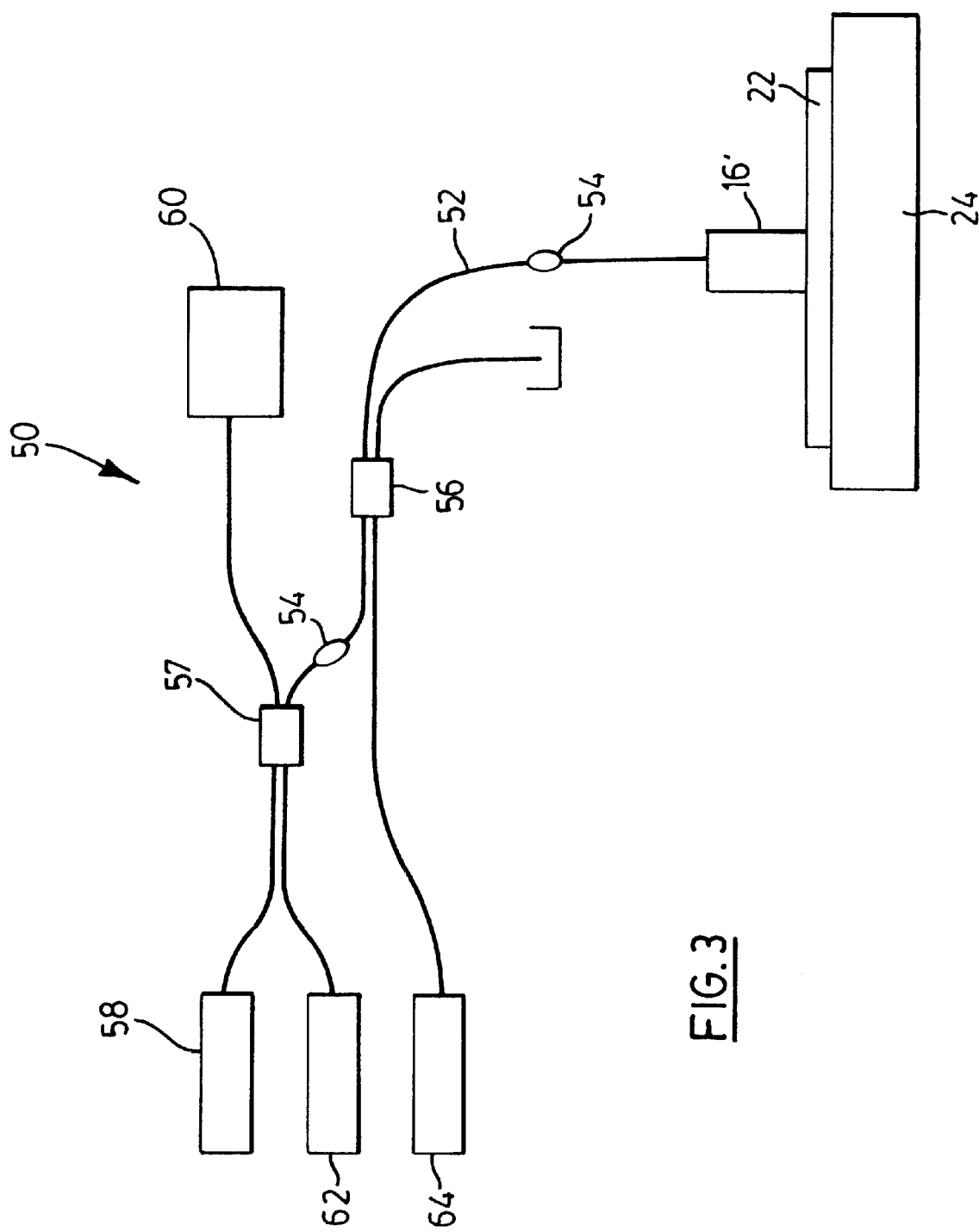
FIG. 3 is a schematic drawing of an embodiment of a torque and strain sensor employing a polarization maintaining optical fiber.

In some applications it may be highly desirable to have only one fiber running between the sensing element and the control unit that contains the light source and detector(s). FIG. 3 is a more detailed illustration of a sensor 50 that permits simultaneous monitoring of the parallel- and perpendicular-polarized components (I and I') using single input/output fiber 12. Sensor 50 includes lengths of polarization maintaining (PM) fiber 52 connected by PM connectors 54, one fiber optic 2×2 coupler 57 and one fiber-optic polarization splitter 56 in the control unit. The input to the final section of PM fiber 52 must be polarized parallel to one of the fiber's principal axes so that the output is also linearly polarized, and oriented at 45 degrees relative to the direction of maximum applied strain. The combination of the fiber-optic polarization splitter 56 (which spatially separates the two linear polarization components in both the input and reflected beams) and the PM fiber performs the same function provided by the polarizing beamsplitter 42 in the two-fiber sensor 40 (FIG. 2). The power of the light source 58 is measured using a power monitor 60. No additional polarizing element is required between the GRIN lens 16' and the photoelastic material 22 in sensor 50. The two detectors 62 and 64 are used to measure the reflected light components according to Equations 4 and 5.

While measuring both parallel and perpendicular components of the intensity of light is preferred to eliminate the effect of source fluctuations, it will be appreciated that only one component needs to be measured, and when only one component is measured it may be either the component parallel to the selected input polarization direction or the component perpendicular to the selected input polarization direction as long as the polarization component is tilted with respect to strain-induced fast and slow orthogonal axes in the strain-sensitive material so that it has a projection along both strain-induced fast and slow orthogonal axes. The component that is actually measured will depend on the geometry of the apparatus, the embodiment shown in FIG. 1 being configured so that the parallel component is measured.

Figure 1B:
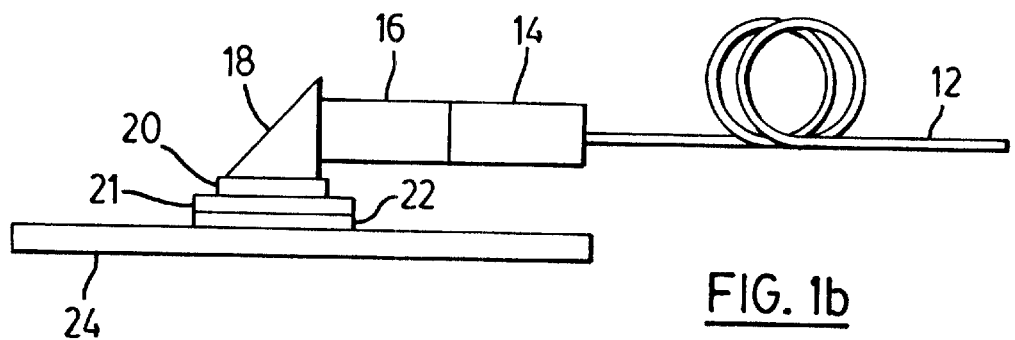

Regardless of whether the light is circularly, linearly or elliptically polarized, signal fading will occur for those values of the strain difference, $\varepsilon_y - \varepsilon_x$, for which $\cos(\phi_y - \phi_x)$= ±1 (i.e. for which dS/d$\varepsilon$=0). To achieve maximum sensitivity, the sensor should be operated in a region of linear response, corresponding to the quadrature points where $\cos(\phi_y - \phi_x)$=0. In the absence of any built-in birefringence (such as might result from the epoxy curing process), signal fading for the designs described above, for the case of linearly polarized input light, will occur under conditions of zero strain difference, where $\epsilon_y-\epsilon_x=0$, and the sensor will be incapable of measuring low values of strain. Referring to FIG. 1b, this problem can be corrected by inserting a birefringent wave plate 21 into the sensor head assembly to shift the quadrature point to match the region of strain values that are to be measured. The wave plate 21 should be epoxied between the polarizing element and the photoelastic material. If it is oriented with one of its principal axes parallel to the direction of maximum applied strain, it will add a fixed phase delay to the strain-induced phase delay between the x and y polarization components (Equation 3). If, for example, the additional phase delay is $\pi/2$ (for the sum of both the forward and reverse pass though the wave plate), then the quadrature point will match the zero strain condition.

For designs that make use of circularly or elliptically polarized input light, the signal fading points will not coincide with zero strain difference. Nevertheless it may still be advantageous to insert a wave plate 21 to shift the quadrature point.

Any of the configurations illustrated in FIGS. 1a, 1b, 2 and 3 may be modified so as to direct the light beam through the photoelastic element without a retroreflecting coating on its far side. Referring to FIG. 2b, this would require a small hole 180 to be drilled in the test piece 24 to open up an optical path, and the output light would be collected on the side of the test piece 24 opposite to the sensing element 22. The nonreflecting equivalent of FIG. 1 employs a second polarizer and GRIN lens/fiber combination (not shown) on the output side. In the nonreflecting equivalent of FIG. 2a, shown in FIG. 2b, a polarizing beamsplitter 42 and two output fibers 184 and 186 are needed on the output side, but a single input fiber 12 and polarizer 20 are sufficient on the side with the sensing element 22.

Figure 4:
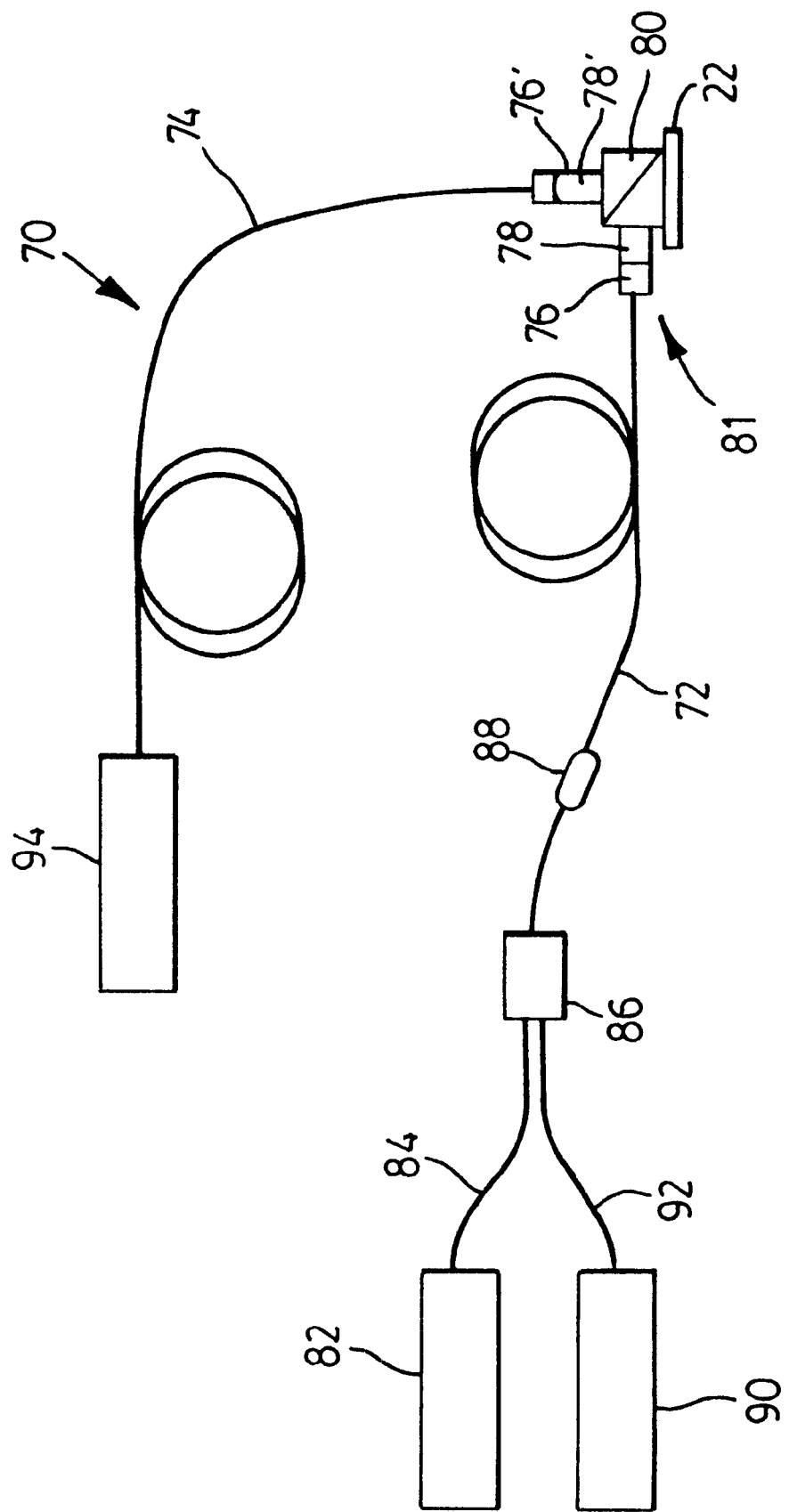
FIG. 4 is a schematic drawing of an embodiment of the sensor using two optical fibers.

FIG. 4 illustrates a more detailed view of a two-fiber sensor shown generally at 70. The input/output fiber 72 and the crossed-polarized output fiber 74 are standard 50/125 graded index multimode fibers. Both of these fibers 72 and 74 are terminated in glass capillary tubes 76, 76' respectively with a polished end to facilitate bonding to a 1.8 mm, 0.29 pitch GRIN lens 78 and 78' during assembly of the fibers with the polarizing beam splitter 80 forming part of sensor head 81. The optical source 82 is either a high power superluminescent diode (SLD) operating at a wavelength of $\lambda=850$ nm or a lower power, 850 nm light emitting diode (LED). The input light is coupled into one arm 84 of a fused 3-dB fiber coupler 86, made using 50/125 multimode fiber, which is attached to the input/output fiber 72 by means of a fusion splice or an FC fiber-optic connector 88. Detector 90, which is connected to the other arm 92 of coupler 86, and detector 94, which is connected to the output end of the crossed-polarized output fiber 74, are standard silicon photodiodes. The polarizing beamsplitter 80 is 5 mm on a side and is coated for operation at $\lambda=850$ nm. The strain-sensitive element is a piece (several mm square) of 1 mm thick PS-1 photoelastic sheet 22 (Intertechnology Inc. part # PS-1C Clear) that has had a reflective aluminum coating evaporated on one side thereof.

In all the embodiments of the sensor disclosed herein the output of the detectors may be input into a computer controller or processor for processing the intensity data and outputting the strain and/or torque. The output signals from the photodetectors are proportional to I and I' in equations 4 and 5. The computer processing involves extracting the strain difference from these signals using equations 3 and 6.

It will be understood that in the embodiments of the apparatus that do not use polarization maintaining fibers, multimode optical fibers are preferred since they work considerably better than single mode fibers but single mode optical fiber may still be used. In the embodiments using polarization maintaining fibers, single mode optical fibers are used.

Figure 5A:
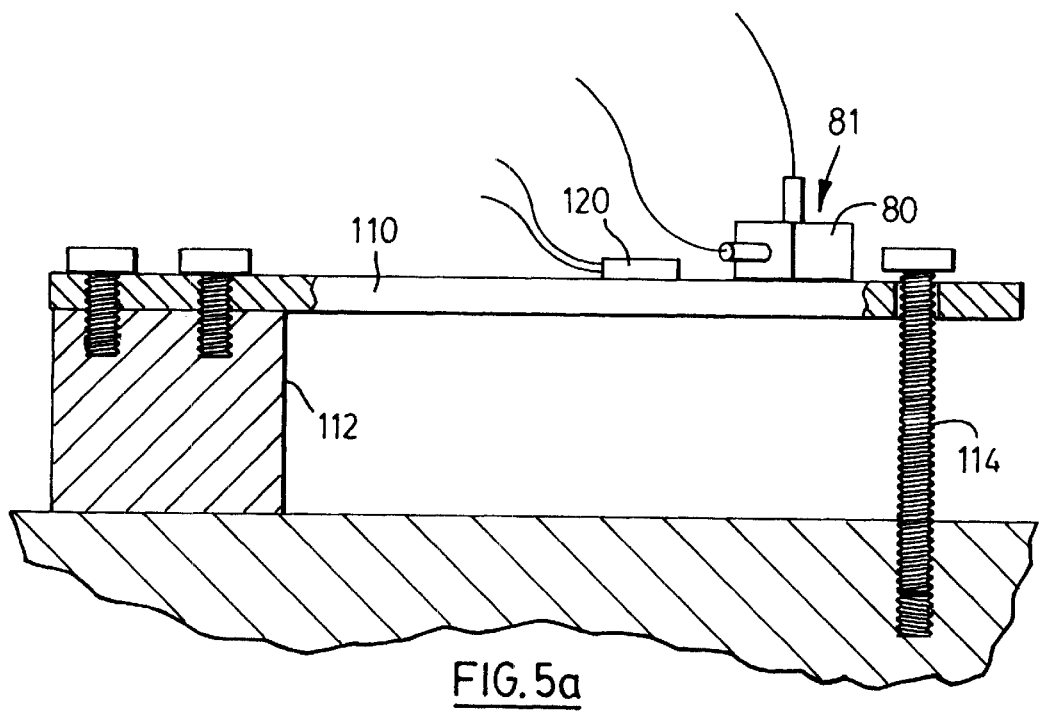
FIG. 5a is a side view of a test rig for testing the strain and torque sensor.
Figure 5B:
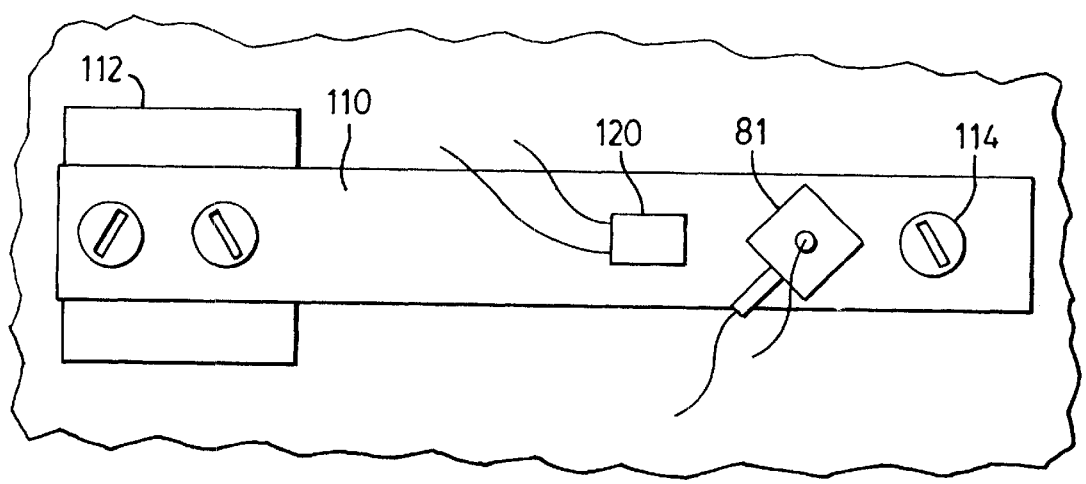

Tests of the efficacy of the sensor disclosed herein were conducted. The sensor head 81 shown in FIG. 4 was first assembled by epoxying the input GRIN lens 78 and 78' and the photoelastic sheet 22 to the polarizing beamsplitter 96 with UV-curing optical epoxy. Then the glass capillary that terminates the input fiber was epoxied to the GRIN lens 78 after active alignment so as to maximize the reflected intensity reaching detector 90. The second GRIN lens 78' and the fiber 74 leading to detector 94 were then aligned and epoxied in the same way, and finally the entire assembly is attached to the test piece using an instant epoxy that is commonly used to bond electrical strain gauges. Referring to FIGS. 5a and 5b the test piece was an aluminum bar 110 with dimensions 305×19×9.5 mm that is held rigidly at one end with the end portion bolted to a solid block 112 and deflection being achieved by means of a machine screw 114 at the other end so as to induce a longitudinal strain. The optical sensor head 81 was oriented so that the sides of the polarizing beamsplitter cube 80 and the input polarization form a 45 degree angle with the length of the cantilevered bar. For comparison purposes, an electrical strain gauge 120 was mounted on the bar in close proximity to the optical sensor head 80.

Figure 6:
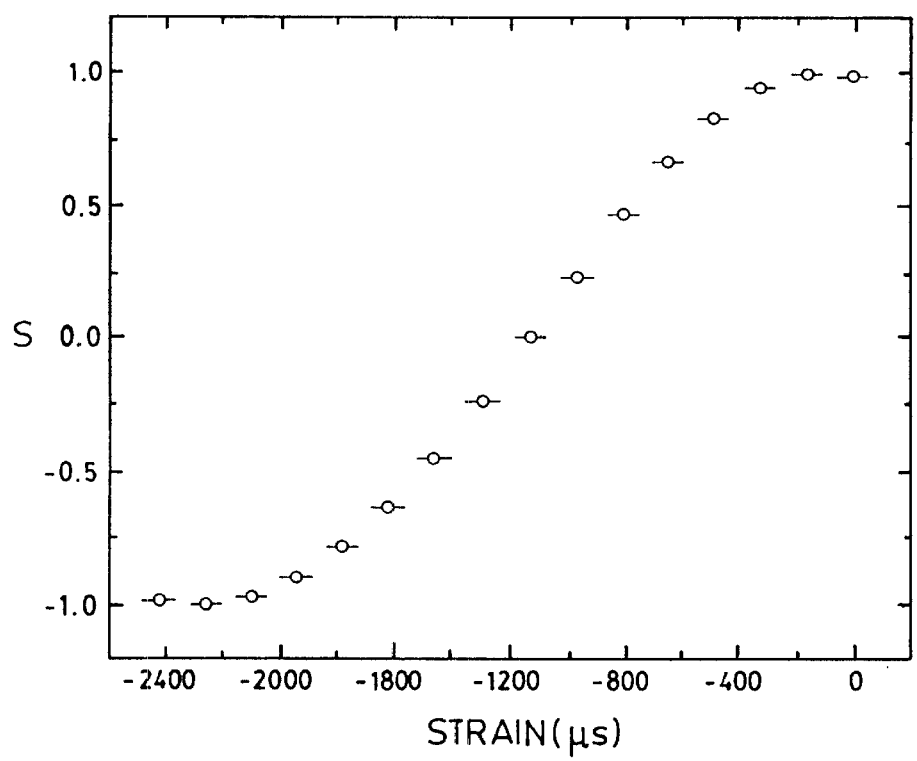
FIG. 6 is a plot of measured sensor signal S as a function of applied strain measured in accordance with the present invention.

The intensities I and I' in Equation 6 are taken to be the photocurrents measured at detectors 90 and 94, respectively, each one being normalized to the maximum signal detected as the strain is swept through its full range. FIG. 6 shows the resulting signal, S, as a function of the electrical strain gauge reading for a series of applied strain values between zero and $-2400\,\mu\epsilon$. The response is sinusoidal with a phase that varies with applied strain at a rate of 0.00142 rad/$\mu\epsilon$. S was measured with a relative uncertainty of $\pm 2.5\times 10^{-4}$, as limited by detector noise and the quantization error in the 12-bit analog-to-digital converters used to record I and I'. This uncertainty translates into a strain sensitivity of $\pm 0.6\,\mu\epsilon$ in the linear portion of the S vs. strain curve (approximately $-1750$ to $-550\,\mu\epsilon$). The error bars in FIG. 6 correspond to averaging 20 readings at each strain setting, which improves the strain sensitivity to $\pm 0.3\,\mu\epsilon$.

The rate of change of S with strain varies linearly with the thickness of the photoelastic sheet that is used as the sensing element. Increasing this thickness will enhance the sensitivity to strain, but it also reduces the period of the sinusoidal oscillations in S. Thus there is an inherent design tradeoff between sensitivity and operating range. The limitations on the operating range can be removed using various methods to avoid signal fading and remove the ambiguities of the sinusoidal response [see R. D. Turner, D. G. Laurin, and R. M. Measures, "Localized Dual-wavelength Fiber-optic Polarimeter for the Measurement of Structural Strain and Orientation," Appl. Opt. 31(16), 2994–3003 (1992)], but none of these methods was employed in the present studies.

Figure 7:
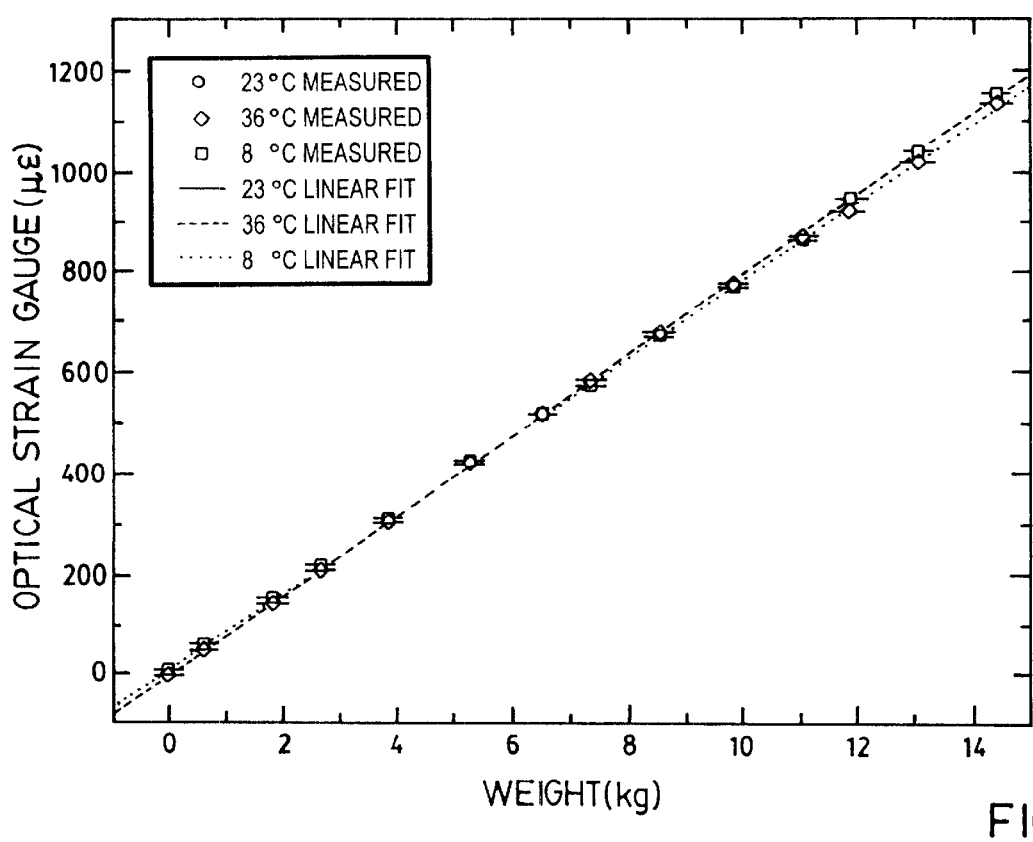
FIG. 7 is a plot of optical strain sensor reading as a function of the mass suspended from a cantilevered bar under test with measurements being carried out in a temperature controlled chamber at three different temperature settings.
Figure 8:
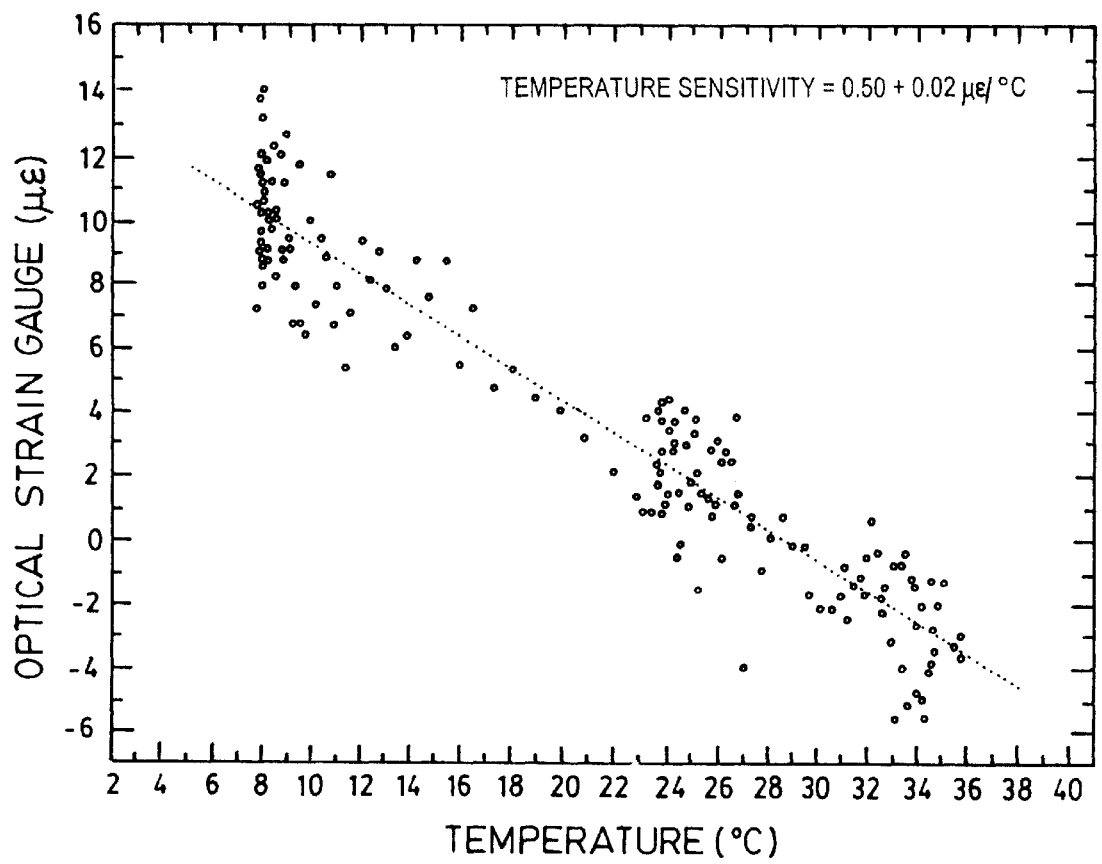
FIG. 8 is a plot of optical strain sensor reading as a function of ambient temperature for a constant value of applied strain.

The temperature sensitivity of the optical strain sensor was measured by placing the entire test assembly in a thermally insulated enclosure that could be heated or cooled. In order to remove any complications that might result from thermal expansion of the machine screw that was previously used to apply the strain, the cantilevered bar was subjected to strain by hanging a series of fixed weights from its free end. FIG. 7 shows the optical strain sensor reading as a function of suspended weight for three different ambient temperatures. The maximum observed deviation corresponds to a temperature dependence of 0.6 $\mu\epsilon/°$ C. The temperature sensitivity was also measured by holding the strain value. constant while the temperature was varied over a range of approximately 30 degrees. The results of this measurement are shown in FIG. 8. The thermal apparent strain sensitivity was observed to be 0.50±0.02 $\mu\epsilon/°$ C. These low levels of temperature sensitivity were only observed after the epoxies had been thermally cured so that the inventors believe that strain asymmetry in the epoxies is a large contributor to the residual temperature dependence and that it will be possible to reduce it further.

The inventors have developed a simple polarimetric fiber-optic strain sensor with a very low sensitivity to temperature. It measures the difference between the strains along two orthogonal directions in a thin sheet of photoelastic material therefore allowing it to be configured as a torque sensor. The reduced temperature sensitivity depends upon a geometry in which the illumination is normal to the surface of the test object, so that the large thermal apparent strains along the two orthogonal measurement directions disappear from the difference measurement. The present sensors have exhibited a strain sensitivity of less than 0.3 $\mu\epsilon$ over a 1200 $\mu\epsilon$ wide operating range, and a thermal apparent strain sensitivity of less than 0.5 $\mu\epsilon/°$ C.

As stated above, a very significant result obtained with the present sensor is the reduced sensitivity of the sensor to temperature fluctuations which results from the fact that the illumination is perpendicular to the surface of the test object so that all polarization components that are parallel to the surface will experience nearly identical refractive index changes due to thermal effects thereby cancelling temperature induced fluctuations. As noted, while illumination at exactly 90 degrees to the surface will give the best result in terms of temperature insensitivity, good results may be obtained if illumination at angles a few degrees off perpendicular is used.

This sensor can be used to measure a strain that is known to be unidirectional. It can also be used as a torque sensor, if it is oriented so that it senses the difference in strains along the two directions that experience maximum torque-induced tension and compression. For example, on the surface of a drive shaft these two directions are ±45 degrees with respect to the axis. For a disk that is subjected to a torque about an axis that is perpendicular to the surface, these two directions are ±45 degrees with respect to the radial direction on the disk's surface. There are many applications for torque sensing in the robotics, automotive and aerospace industries that would benefit from the inherent advantages that fiber-optic sensors have over their electrical or mechanical counterparts.

The present sensor may be made very small and it requires no electronics or electrical wiring at the point of measurement. The power supply, laser light source and signal processing electronics are remotely located and connected to the sensor head by lightweight optical fibers. In a single element, the present sensor can automatically detect a difference between two orthogonal strains, as is required for the determination of torque. In contrast, a torque sensor based on conventional strain gauges requires two separate unidirectional strain sensors mounted at right angles.

As used herein, the terms "comprises", "comprising", "including" and "includes" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of measuring strain in a workpiece that is insensitive to ambient temperature fluctuations, comprising the steps of:

illuminating a strain-sensitive material with a beam of selectively polarized light, the beam of selectively polarized light being substantially perpendicular to the surface of the workpiece, the strain-sensitive material being in physical contact with the surface of the workpiece;

measuring an intensity of at least one polarization component of the beam of selectively polarized light making at least one pass through the strain-sensitive material, the at least one polarization component being tilted with respect to strain-induced fast and slow orthogonal axes in the strain-sensitive material so that it has a projection along both strain-induced fast and slow orthogonal axes; and calculating from said intensity a difference between strains along the strain-induced fast and slow orthogonal axes in the strain-sensitive material, the difference being substantially independent of ambient temperature fluctuations.

2. The method of measuring strain according to claim 1 including determining a maximum value of said intensity of said at least one polarization component by applying a range of stresses to the workpiece so as to cause the measured intensity to scan through the maximum value of its sinusoidal response, recording the measured intensity for each stress applied to the workpiece, and wherein said step of calculating from said intensity a difference between strains along the strain-induced fast and slow orthogonal axes in the strain-sensitive material includes taking a ratio of the at least one polarization component to the maximum value.

3. The method of measuring strain according to claim 1 wherein said beam of selectively polarized light is a beam of linearly polarized light, including operating said sensor in a region of linear response corresponding to quadrature points in which $\cos(\phi_y-\phi_x)=0$, wherein $\phi_x$ and $\phi_y$ are total optical phase shifts accumulated in passage by x and y polarization components of said beam of selectively polarized light through the strain sensitive material.

4. The method of measuring strain according to claim 1 wherein said beam of selectively polarized light is a beam of circularly polarized light.

5. The method of measuring strain according to claim 1 wherein said beam of selectively polarized light is a beam of linearly polarized light.

6. The method of measuring strain according to claim 1 wherein said beam of selectively polarized light is a beam of elliptically polarized light.

7. The method of measuring strain according to claim 1 wherein said strain-sensitive material is a strain-sensitive photoelastic material.

8. A method of measuring strain in a workpiece that is insensitive to ambient temperature fluctuations, comprising the steps of:

illuminating a strain-sensitive material with a beam of selectively polarized light, the beam of selectively polarized light being substantially perpendicular to the surface of the workpiece, the strain-sensitive material being in physical contact with the surface of the workpiece;

measuring a first intensity of a first polarization component and a second intensity of a second polarization component of the beam of selectively polarized light making at least one pass through the strain-sensitive material, the first and second polarization components being orthogonal to each other and tilted with respect to strain-induced fast and slow orthogonal axes in the strain-sensitive material parallel to the surface of the workpiece so that each of said first and second polarization components has a projection along both strain-induced fast and slow orthogonal axes; and calculating from the first and second intensities a difference between strains along the strain-induced fast and slow orthogonal axes in the strain-sensitive material, the difference being substantially independent of ambient temperature fluctuations.

9. The method of measuring strain according to claim 8 wherein said beam of selectively polarized light is a beam of linearly polarized light, including operating said sensor in a region of linear response corresponding to quadrature points in which $\cos(\phi_y-\phi_x)=0$, wherein $\phi_x$ and $\phi_y$ are the total optical phase shift accumulated in passage by x and y polarization components of said beam of selectively polarized light.

10. The method of measuring strain according to claim 9 wherein said beam of selectively polarized light is a beam of circularly polarized light.

11. The method of measuring strain according to claim 9 wherein said beam of selectively polarized light is a beam of linearly polarized light.

12. The method of measuring strain according to claim 9 wherein said beam of selectively polarized light is a beam of elliptically polarized light.

13. A temperature insensitive strain sensor that is insensitive to ambient temperature fluctuations, comprising:

a strain-sensitive material adapted to be physically contacted to a surface of a workpiece;

light source means and light beam polarization means for illuminating said strain-sensitive material with a beam of selectively polarized light, said beam of selectively polarized light being substantially perpendicular to the surface of the workpiece; and detection means for measuring an intensity of at least one of a first polarization component and a second polarization component in the beam of selectively polarized light making at least one pass through said strain-sensitive material, the at least one of a first and second polarization components being tilted with respect to strain-induced fast and slow orthogonal axes in the strain-sensitive material parallel to the surface of the workpiece so that at least one of the at least first and second polarization components has a projection along both strain-induced fast and slow orthogonal axes; and processing means connected to said detection means for calculating from the intensity of the at least one of a first polarization component and a second polarization component a difference between strains along the strain-induced fast and slow orthogonal axes in said strain-sensitive material, the difference between strains being substantially independent of ambient temperature fluctuations.

14. The strain sensor according to claim 13 wherein the at least one of a first polarization component and a second polarization component is the first polarization component and the second polarization component, and wherein said detection means measures the first intensity of the first polarization component and the second intensity of the second polarization component in said beam of selectively polarized light making at least one traversal through the strain-sensitive material, and wherein said processing means calculates from said first and second intensities a difference between strains along the strain-induced fast and slow orthogonal axes in said strain-sensitive material, said difference being substantially independent of fluctuations in ambient temperature.

15. The strain sensor according to claim 13 wherein said beam of selectively polarized light is a beam of circularly polarized light.

16. The strain sensor according to claim 13 wherein said beam of selectively polarized light is a beam of linearly polarized light.

17. The strain sensor according to claim 13 wherein said beam of selectively polarized light is a beam of elliptically polarized light.

18. The strain sensor according to claim 13 wherein said strain-sensitive material is a strain-sensitive photoelastic material.

19. A temperature insensitive strain sensor that is insensitive to ambient temperature fluctuations, comprising:

a strain-sensitive material adapted to be physically contacted to a surface of a workpiece;

light source means and light beam polarization means for illuminating said strain-sensitive material with a beam of selectively polarized light, said beam of selectively polarized light being substantially perpendicular to the surface of the workpiece; and detection means for measuring an intensity of a first polarization component and a second polarization component in the beam of selectively polarized light making at least one pass through said strain-sensitive material, each of the first and second polarization components being tilted with respect to strain-induced fast and slow orthogonal axes in the strain-sensitive material parallel to the surface of the workpiece so that each of the first and second polarization components have a projection along both strain-induced fast and slow orthogonal axes; and processing means connected to said detection means for calculating from the intensities of the first and second polarization components a difference between strains along the strain-induced fast and slow orthogonal axes in said strain-sensitive material, the difference between strains being substantially independent of ambient temperature fluctuations.

20. The strain sensor according to claim 19 wherein said beam of selectively polarized light is a beam of circularly polarized light.

21. The strain sensor according to claim 19 wherein said beam of selectively polarized light is a beam of linearly polarized light.

22. The strain sensor according to claim 19 wherein said beam of selectively polarized light is a beam of elliptically polarized light.

23. The strain sensor according to claim 19 wherein said strain-sensitive material is a strain-sensitive photoelastic material.

* * * * *